(No Model.)

J. DU BOIS.
MOVABLE DAM AND GATE.

No. 303,825. Patented Aug. 19, 1884.

Attest
Sidney P. Hollingsworth
Newton Wyckoff

Inventor.
John Du Bois.
By his Attorney
Philip T. Dodge.

UNITED STATES PATENT OFFICE.

JOHN DU BOIS, OF DU BOIS, PENNSYLVANIA.

MOVABLE DAM AND GATE.

SPECIFICATION forming part of Letters Patent No. 303,825, dated August 19, 1884.

Application filed December 14, 1883. (No model.)

*To all whom it may concern:*

Be it known that I, JOHN DU BOIS, of Du Bois, in the county of Clearfield and State of Pennsylvania, have invented certain Improvements in Movable Dams and Gates, of which the following is a specification.

My invention relates to that class of rising and falling dams and gates which consists of hinged overlapping leaves or sections, the elevation of which is effected by admitting water under pressure beneath them, as represented in various Letters Patent of the United States hitherto granted to me.

The object of the present invention is to avoid the application of excessive pressure beneath the dam; and to this end it consists in constructing the overlapping edges of the leaves or sections in such manner that when the dam reaches the proper limit of elevation openings will be exposed for the escape of the water between or through the edges of the leaves.

Figure 1:
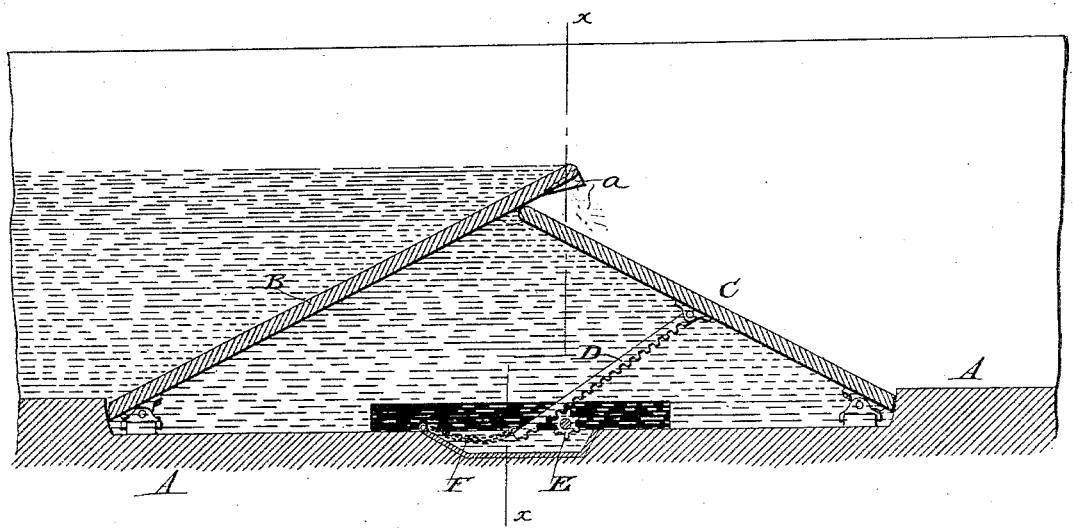
Figure 2:
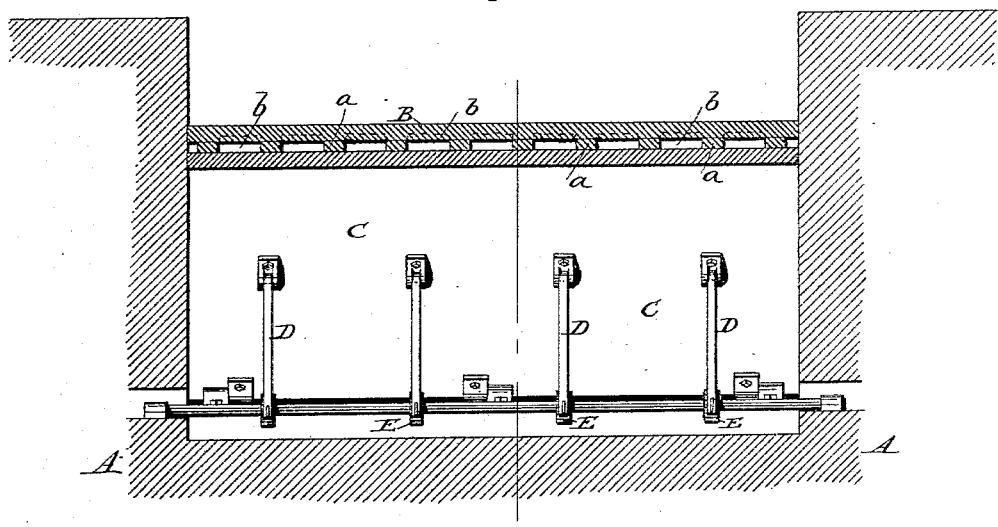

Referring to the accompanying drawings, Figure 1 represents a vertical section through a dam having my improvement applied thereto. Fig. 2 is a section of the same on line $x$ $x$.

A represents the base or foundation of the dam, and B C the two leaves or sections forming the body of the dam. The leaf B is hinged at its upstream end and overlaps the free edge of the leaf C, which is hinged at the downstream end. Suitable gates or wickets will be provided for the admission of water beneath the leaves when they are to be lifted, and for permitting its escape when they are to be lowered. These gates, together with the portions of the dam above referred to, may be constructed in the same manner as in either of the various patents hitherto granted to me, to which reference may be made for a detailed description thereof. To the upper leaf, B, at or near its free edge, I apply on the under side a series of downwardly-projecting blocks or wedges, $a$, which may be separated from each other to any suitable distance. During the ordinary operation of the dam, and while its elevation is within the prescribed limit, these blocks are inoperative. When, however, the dam reaches the extreme elevation, the edge of the leaf C, riding beneath the blocks $a$, lifts the under surface of the leaf B above the edge of the leaf C, thus producing between the two leaves a series of openings, $b$, such as plainly represented in Fig. 2, through which the water may escape freely, so that the application of an excessive pressure within or beneath the dam becomes impossible.

The essential feature of the improvement consists in constructing the co-operating edges of the leaves B C, in such manner that when they reach the proper limit of elevation openings will be formed between them for the escape of water. Provided this action is retained, the form of the blocks may be modified as desired; or in place of the blocks, recesses, or openings may be formed in the under surface of the leaf B, as indicated in dotted lines in the drawings.

For the purpose of insuring a uniform rise and fall of the dam at all points in its surface I pivot to the leaf C bars D, provided with two racks which engage in pinions E, a series of these pinions being mounted on a single shaft extending lengthwise beneath the dam, as in my patent dated July 31, 1883, No. 282,062. The elevation of the leaf C is limited by means of a chain, F, attached to the lower end of the bar D, and secured to an eyebolt or other equivalent fastening in the foundation.

The present invention is restricted to those matters and things which are hereinafter claimed, and as to all matters which may be described or shown, but which are not claimed, the right is reserved to make the same the subject of a separate application.

Having thus described my invention, what I claim is—

1. In a rising and falling dam, the hinged overlapping leaves provided at the overlapping edges with means of the character described and shown to permit the escape of water from beneath them.

2. In a rising and falling dam, the combination of the leaf C, the overlapping leaf B, and blocks $a$, to cause the separation of the leaves when an excessive elevation is effected, whereby the escape of the surplus water is permitted and the dam relieved from strain.

3. In combination with the rising and falling leaves, the shaft and its pinions, the rack-bars, and the chains connecting the rack-bars with the base or foundation.

JOHN DU BOIS.

Witnesses:
GEORGE RICHARD VOSBURG,
THOMAS GEORGE GORMLY,